D. W. LYDELL.
MECHANISM FOR FORWARD AND REAR WHEEL DRIVES.
APPLICATION FILED NOV. 2, 1916.

1,244,221.

Patented Oct. 23, 1917.
3 SHEETS—SHEET 2.

Witnesses
Philip Turell
Frances J. Boswell

Inventor
D. W. Lydell
By D. Swift & Co.
Attorneys

D. W. LYDELL.
MECHANISM FOR FORWARD AND REAR WHEEL DRIVES.
APPLICATION FILED NOV. 2, 1916.
1,244,221.
Patented Oct. 23, 1917.
3 SHEETS—SHEET 3.
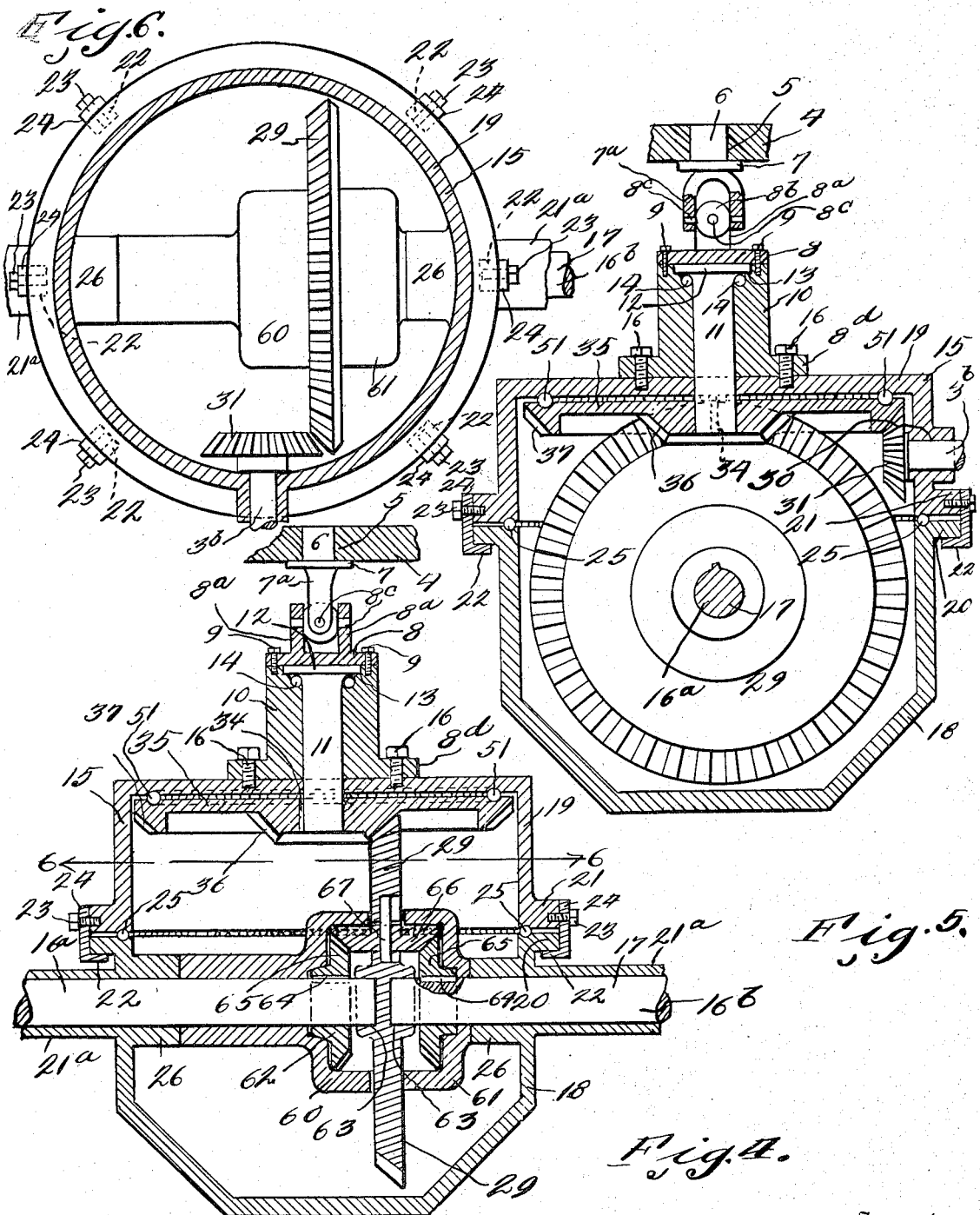
Witnesses
Philip Ferrell
Frances M. Orwell
Inventor
D. W. Lydell
By D. Swift & Co.
Attorneys

UNITED STATES PATENT OFFICE.

DON W. LYDELL, OF PARIS, MICHIGAN.

MECHANISM FOR FORWARD AND REAR WHEEL DRIVES.

1,244,221.  Specification of Letters Patent.  Patented Oct. 23, 1917.

Application filed November 2, 1916. Serial No. 129,128.

*To all whom it may concern:*

Be it known that I, DON W. LYDELL, a citizen of the United States, residing at Paris, in the county of Mecosta, State of Michigan, have invented a new and useful Mechanism for Forward and Rear Wheel Drives; and I do hereby declare the following to be a full, clear, and exact description of the invention, such as will enable others skilled in the art to which it appertains to make and use the same.

This invention relates to a new and useful mechanism for driving the forward and rear wheels of an automobile, tractor or other motor driven vehicle, and an object of the invention is to provide a mechanism of this kind, which is simple, efficient and practical in construction, and may be manufactured at a slight cost.

In practical fields, the details of construction may necessitate alterations falling within the scope of what is claimed.

The invention comprises further features and combination of parts, as hereinafter set forth, shown in the drawings, and claimed.

In the drawings:—

Fig. 4 is a sectional view on line 4—4 of Fig. 1.

Fig. 5 is a sectional view on line 5—5 of Fig. 1.

Fig. 6 is a sectional view on line 6—6 of Fig. 4.

Figure 1:
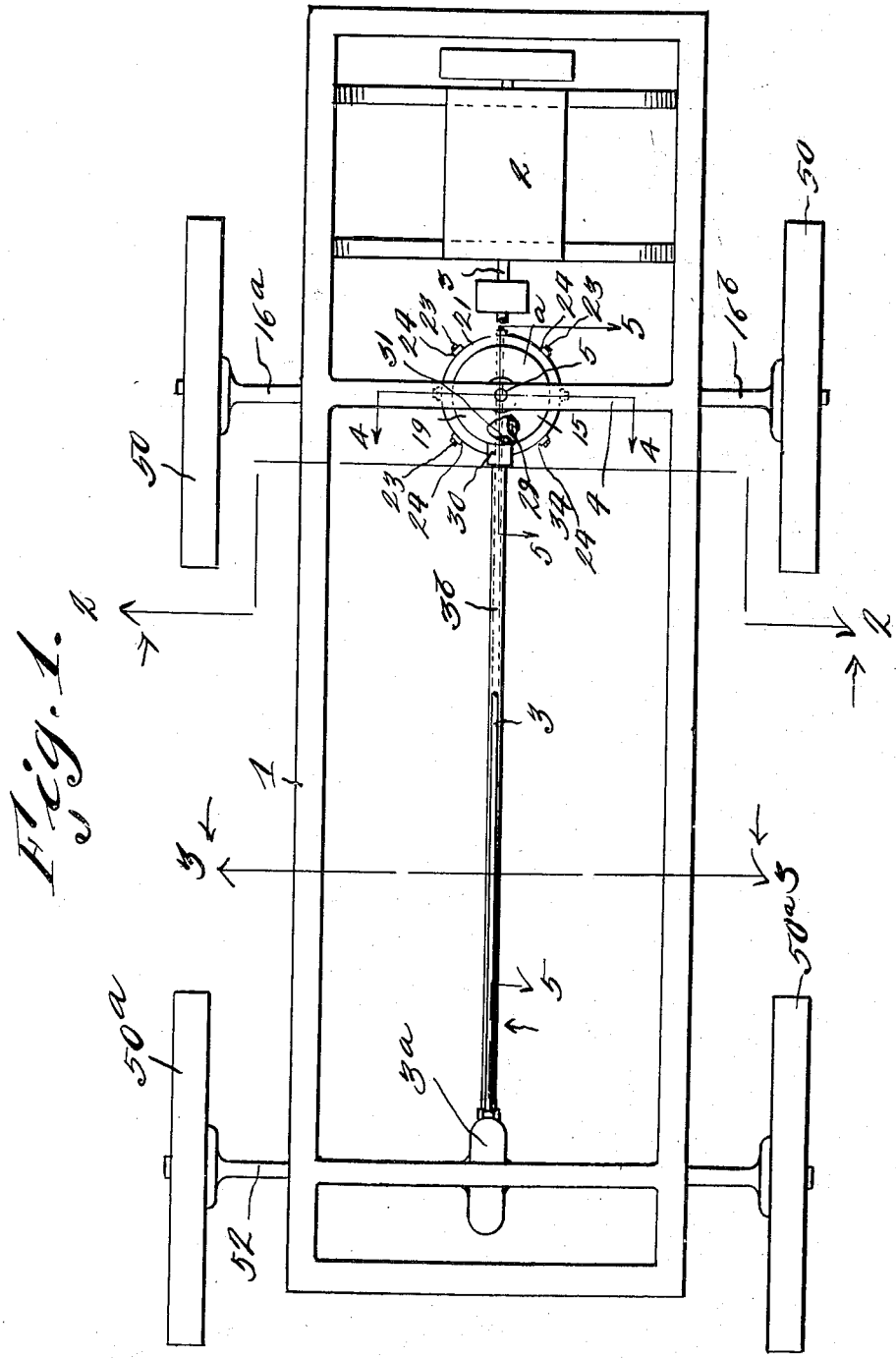
Figure 1 is a plan view of a motor driven vehicle frame, showing the front and rear wheel drive mechanism, as applied thereto.
Figure 2:
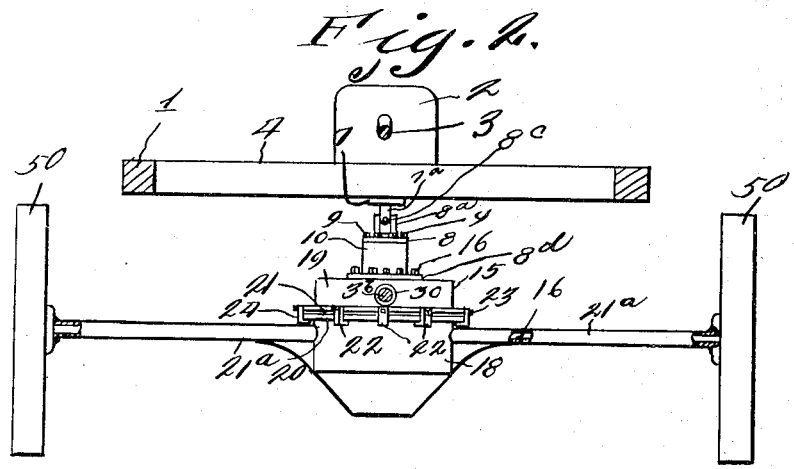
Fig. 2 is a sectional view on line 2—2 of Fig. 1.
Figure 3:
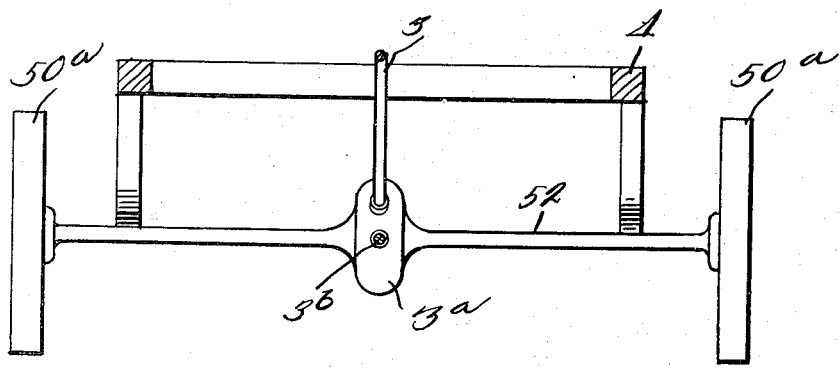
Fig. 3 is a sectional view on line 3—3 of Fig. 2.

Referring more especially to the drawings, 1 designates the frame of a motor driven vehicle or tractor having a conventional form of engine 2 mounted thereon, and which engine is provided with the usual drive shaft 3 which extends rearwardly and downwardly to the usual form of rear differential mechanism $3^a$, the detail structure of which is unessential and forms no part of the present invention, therefore, the same is not shown. The forward portion of the frame 1 has a transverse bar 4, and arranged in an opening 5 of which is a stud 6 of a plate 7, which is provided with downwardly extending ears $7^a$.

The mechanism for driving the front axle of the motor vehicle is mounted in a suitable casing, and on this casing is a bearing sleeve 10, there being a plate 8 secured to the upper end of the bearing sleeve by means of the screw bolts 9.

This plate 8 is provided with upwardly extending ears $8^a$, which are positioned at right angles to the ears $7^a$. These ears $8^a$ and $7^a$ receive the lugs $8^c$ of the member $8^b$, thereby providing a universal joint, between the bar 4 and the plate 8 of the bearing sleeve 10. By this construction, the casing of said front axle driving mechanism is connected to the bar 4 of said frame 1, in order that a universal joint action is afforded between the parts, whereby the front wheels of the motor driven vehicle may accommodate themselves to the irregularities of the road bed without unduly rocking the frame 1.

Mounted in the bearing sleeve 10 is a shaft 11, the upper end of which is provided with a flange 12 engaging a recess 13 of the bearing sleeve 10, there being ball bearings 14 in a suitable raceway of the bearing sleeve, so that the flange 12 may rotate freely, and with it the shaft 11.

Extending forwardly from and operated by the rear conventional form of differential $3^a$ is a shaft $3^b$, which is extended into and mounted in a bearing of the casing 15 of the front axle driving mechanism, and to this casing 15 the flanged end $8^d$ of the bearing sleeve 10 is secured by the screw bolts 16. This casing 15 consists of the two sections 18 and 19. The lower section 18 is provided with axially alined laterally disposed tubular bearings $21^a$ for the two sections $16^a$ and $16^b$ of the front drive axle 17. The inner ends of said tubular bearings $21^a$ terminate in two sections 60 and 61 of a casing, in which is arranged a conventional form of differential gear mechanism 62.

The section 18 of said casing 15 is provided with an annular flange 20, adjacent to which the flange 21 of the section 19 of casing is disposed, there being an annular band 24 surrounding the two flanges and provided with underlying projections 22, engaging the under flange 20, so as to hold the two sections of the casing together as shown in Fig. 4. Suitable bolts 23 extend through the band 24 and into the flange 21, hold the band to the section 19, hence the two sections of the casing are connected. Interposed between the two sections of the casing are suitable ball bearings 25, so that one section may move freely relative to the other. The inwardly extending portion 26 of the axially alined sleeves 21ª are thicker and more substantial, in order to support the differential casing 60. The two sections 16ª and 16ᵇ of the front axle are axially alined, and their adjacent ends engage the bearings 63 of the hub of the beveled gear 29. Also secured upon said sections 16ª and 16ᵇ of the front axle by means of feathers or keys 64 are the beveled gears 65, which mesh with the beveled gears 66, which are journaled on pins 67, which are mounted in bearings of the beveled gear 29. By this construction of differential gearing, the sections 16ª and 16ᵇ of the front axle are allowed to rotate at variable speeds, when turning a curve. The upper section 19 of said casing 15 is provided with a suitable bearing 30 for the forward end of the shaft 3ᵇ, on which forward end a beveled gear 31 is fixed. The lower end of the vertical shaft 11 has keyed thereto by means of a feather 34 a disk wheel 35, which is provided with a double set of gear teeth 36 and 37. The teeth 37 are engaged by the beveled gear 31, while the teeth 36 are engaged by the beveled gear 29, so that when the drive shaft 3ᵇ is driven from the rear differential mechanism, power will be transmitted to the forward axle 17, upon the outer ends of the sections 16ª and 16ᵇ of which the front wheels 50 are mounted, to which power is imparted for driving the machine forward. Ball bearings 51 are mounted between the disk wheel 35 and the upper wall of the section 19 of the casing 15, so that the disk wheel 35 will freely rotate. The rear axle 52 is provided with rear wheels 50ª, and which rear axle may be driven by any suitable or conventional form of differential gearing with the engine shaft. The engine 2 may be disposed in any suitable location, either above the forward front wheel drive mechanism, or slightly forwardly or rearwardly of said mechanism, or in any other suitable place.

The invention having been set forth, what is claimed as new and useful, is:—

In a front wheel drive mechanism the combination of a casing and a front axle of a motor driven vehicle, of a beveled gear in said casing, said front axle consisting of two sections axially alined and having their adjacent ends engaging bearings of said beveled gear, so that said sections will turn loose in said bearings, said beveled gear having differential gear connections with the two sections of said front axle, and gear connections connecting said beveled gear and the rear driven differential of a motor driven vehicle, said means comprising a shaft journaled vertically in the upper part of the casing and having a disk wheel provided with a double set of beveled gear teeth, one set being larger in diameter than the other, the smaller set of gear teeth of said disk wheel being in mesh with the beveled gear of said front axle, a shaft connected to and driven by the rear differential of said motor driven vehicle and having its forward end mounted in a bearing of said casing and provided with a beveled pinion meshing with the set of beveled teeth of said disk wheel that are larger in diameter.

In testimony whereof I have signed my name to this specification in the presence of two subscribing witnesses.

DON W. LYDELL.

Witnesses:
BURTON LYDELL,
F. E. McCOLLOM.